US007908243B2

(12) United States Patent
Mishra

(10) Patent No.: US 7,908,243 B2
(45) Date of Patent: Mar. 15, 2011

(54) CONSIDERING TRANSIENT DATA ALSO IN REPORTS GENERATED BASED ON DATA EVENTUALLY STORED IN A DATA-WAREHOUSE

(75) Inventor: Amulya Mishra, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 572 days.

(21) Appl. No.: 11/306,807

(22) Filed: Jan. 11, 2006

(65) Prior Publication Data

US 2007/0124275 A1 May 31, 2007

(30) Foreign Application Priority Data

Nov. 25, 2005 (IN) .................................. 1723/2005

(51) Int. Cl.
*G06F 7/00* (2006.01)
(52) U.S. Cl. ........................................ 707/602; 707/603
(58) Field of Classification Search .............. 707/1, 100, 707/602, 603
See application file for complete search history.

(56) References Cited

U.S. PATENT DOCUMENTS

| 7,100,195 B1* | 8/2006 | Underwood ..................... 726/2 |
| 7,233,952 B1* | 6/2007 | Chen ............................. 707/100 |
| 2002/0128996 A1* | 9/2002 | Reed ................................. 707/1 |
| 2003/0171876 A1* | 9/2003 | Markowitz et al. ............. 702/20 |
| 2005/0251533 A1* | 11/2005 | Harken et al. ............. 707/104.1 |
| 2006/0265323 A1* | 11/2006 | Winter et al. .................. 705/37 |

OTHER PUBLICATIONS

Data Warehousing: Architecture and Implementation, by Mark Humphries; Michael W. Hawkins; Michelle C. Dy, Publisher: Prentice Hall, Pub Date: Dec. 30, 1998, Print ISBN-10: 0-13-080902-0, Print ISBN-13: 978-0-13-080902-5.*
XML Data Management: Native XML and XML-Enabled Database Systems, by Akmal B. Chaudhri; Awais Rashid; Roberto Zicari, Publisher: Addison Wesley Professional, Pub Date: Mar. 12, 2003, Print ISBN-10: 0-201-84452-4, Print ISBN-13: 978-0-201-84452-8.*
SQL Server DTS, by Steve Hughes,; Steve Miller,; Jim Samuelson,; Marcelino Santos,; Brian Sullivan, Publisher: Sams, Pub Date: Aug. 27, 2001, Print ISBN-10: 0-7357-1123-2, Print ISBN-13: 978-0-7357-1123-5.*
Justin Langseth—Founder and CTO of Claraview; "Real-Time Data Warehousing Challenges and Solutions", from http://dssresources.com/papers/features/langseth/langseth02082004.html; pp. 1-11; Feb. 8, 2004, D.J. Power, DSSResources.com.
Micheal Haisten, "Designing a data warehouse", from http://www.damanconsulting.com/solutions/data_org/whitepaper/designing.pdf; download date—Jul. 5, 2005; pp. 1-10; Daman Consulting.
Colin White; "Building the Realtime Enterprise", TDWI Report Series; Nov. 2003; pp. 1-35; The Data Warehousing Institute, 5200 Southcenter Blvd., Suite 250, Seattle, WA 98188; www.dw-institute.com.
Nandeep—Change Data Capture Implementation in Oracle Data Warehouses—Part 1; from http://www.databasejournal.com/features/oracle/article.php/1588261; Database Journal; pp. 1-8; Feb. 20, 2003, Jupitermedia Corporation.

* cited by examiner

*Primary Examiner* — Debbie Le
*Assistant Examiner* — Gary Koo
(74) *Attorney, Agent, or Firm* — Narendra Reddy Thappeta

(57) ABSTRACT

A data-warehouse is updated with transaction data from various application databases periodically, and the transient data (the data not yet updated in the data-warehouse) from the application databases is transferred to an intermediary data storage. A report generator may consider the data in both the data-warehouse and the intermediary data storage in generating reports. Due to the use of the intermediary data storage, the reports may be generated on current data as well.

15 Claims, 7 Drawing Sheets

| Transaction Identifier 410 | Transaction Number 420 | Amount 430 | Discount% 440 | Final Amount 450 | Transaction Date 460 | Status 470 |
|---|---|---|---|---|---|---|
| 1000 | AMUL-1000 | 1000 | 10 | 900 | 10-Oct-2005 | Y |
| 1001 | AMUL-1001 | 1000 | 10 | 900 | 15-Oct-2005 | N |
| 1002 | AMUL-1002 | 10000 | 10 | 9000 | 16-Oct-2005 | N |

```
511 → <RECORD>
512 → <TRX>
513 →   <TRX_ID>1001</TRX_ID>
514 →   <TRX_NUMBER>AMUL-1001</TRX_NUMBER>
515 →   <TRX_AMOUNT>1000</TRX_AMOUNT>
516 →   <TRX_DISCOUNT>10</TRX_DISCOUNT>
517 →   <TRX_FINAL_AMOUNT>900</TRX_FINAL_AMOUNT>
518 → </TRX>
520 → <TRX>
521 →   <TRX_ID>1002</TRX_ID>
522 →   <TRX_NUMBER>AMUL-1002</TRX_NUMBER>
523 →   <TRX_AMOUNT>10000</TRX_AMOUNT>
524 →   <TRX_DISCOUNT>10</TRX_DISCOUNT>
525 →   <TRX_FINAL_AMOUNT>9000</TRX_FINAL_AMOUNT>
526 → </TRX>
527 → </RECORD>
```

*FIG. 5*

| Transaction Id_STAGED 610 | Transaction #_STAGED 620 | TRX_FINAL_AMOUNT_STAGED 630 |
|---|---|---|
| 1001 | AMUL-1001 | 911 |
| 1002 | AMUL-1002 | 9011 |

CONSIDERING TRANSIENT DATA ALSO IN REPORTS GENERATED BASED ON DATA EVENTUALLY STORED IN A DATA-WAREHOUSE

RELATED APPLICATIONS

The present application is related to and claims priority from the co-pending India Patent Application entitled, "CONSIDERING TRANSIENT DATA ALSO IN REPORTS GENERATED BASED ON DATA EVENTUALLY STORED IN A DATA-WAREHOUSE", Serial Number: 1723/CHE/2005, Filed: 25 Nov. 2005, naming the same inventors as in the subject patent application.

BACKGROUND OF THE INVENTION

1. Field of the Invention

The present invention relates to data-warehouse technologies, and more specifically to a method and apparatus for considering transient data also in reports generated based on data eventually stored in a data-warehouse.

2. Related Art

A data-warehouse generally contains a copy of large volumes of data in a form suitable for querying/reporting/analysis. The data is often generated/created after processing of the corresponding data stored in several databases (commonly known as 'application databases') that are accessed by corresponding applications. The transfer of consolidated information from application databases to data-warehouse may be viewed as containing Extraction, Transformation and Loading operations, and is thus commonly referred to as ETL process, as is well known in the relevant art.

Reports are often generated from various data, for example, to determine the various trends or to know the status of interest. For example, databases may store data corresponding to sales in corresponding regions/locations, the data may eventually be transferred to a data-warehouse, and the data in the data-warehouse may be analyzed to generate the desired reports. Thus, reports are often generated based on the data stored in data-warehouses.

One problem with the above-noted approach is that the reports would not be based on several pieces of data not yet propagated from the databases to the data-warehouse. This is particularly problematic since the interval between execution of ETL process is often large (e.g., order of days) since the ETL process may require substantial amount of computing resources from databases as well as data-warehouse. Such data not yet propagated to the data-warehouse is referred to as 'transient data'.

What is therefore needed is a method and apparatus for considering transient data also in environments in which reports are generated based on data stored in a data-warehouse.

BRIEF DESCRIPTION OF THE DRAWINGS

The present invention will be described with reference to the accompanying drawings briefly described below.

FIG. 4 depicts data in a table in application database used in an embodiment implementing several aspects of the present invention.

FIG. 5 depicts data from application database which are identified as transient data for storing in intermediary data storage.

FIG. 6 contains a table in intermediary data storage storing transient data in an embodiment of the present invention.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

Overview

According to an aspect of the present invention, data from several application databases is transferred to an intermediary storage at short intervals (compared to intervals for ETL process), and reports are generated based on the data in the data-warehouse (which is updated with the data in the application databases) as well as in the intermediate storage. Due to the use of the data received at short intervals, at least a portion of the transient data may also be considered in generating the reports, as desired.

In an embodiment, the intermediary data storage is implemented as a database containing a database schema identical to that of the data-warehouse and contains data from application databases which are updated after the start of the first interval of time.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

Example Environment

Figure 1:
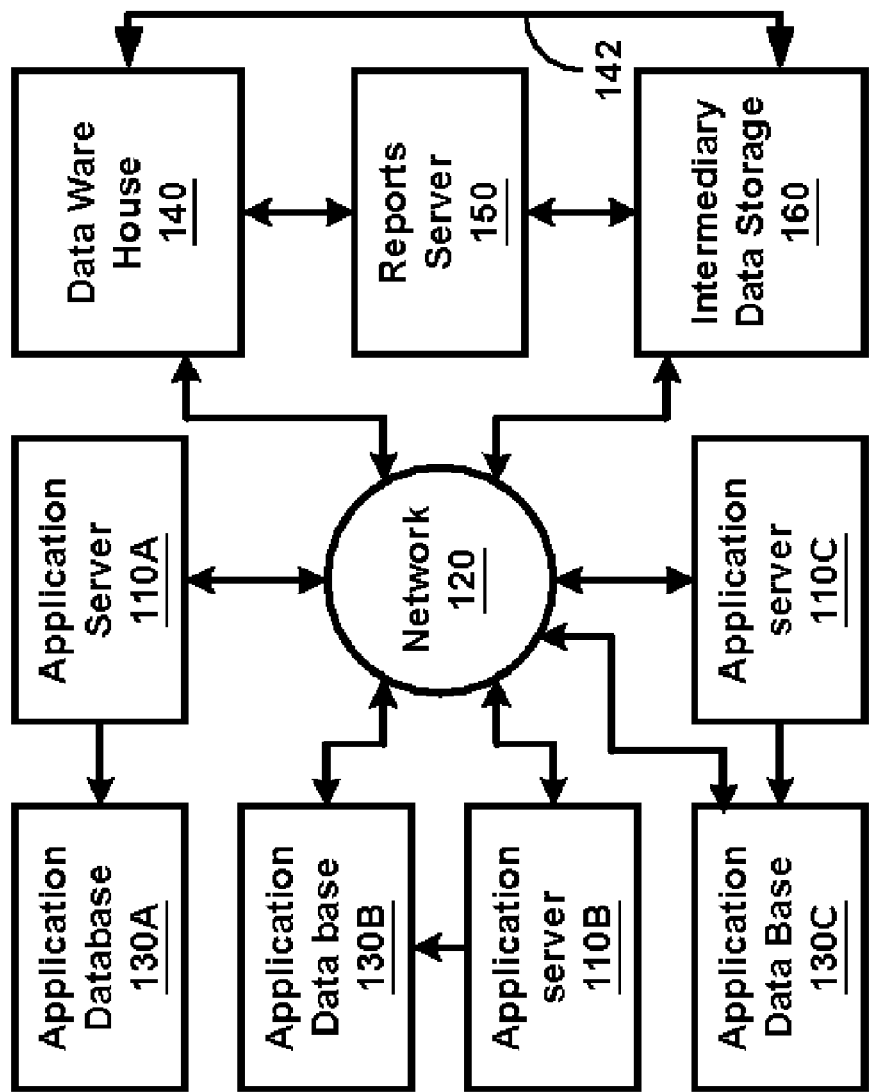
FIG. 1 is a block diagram illustrating the details of an example environment in which various aspects of the present invention can be implemented.

FIG. 1 is a block diagram illustrating an example environment in which various aspects of the present invention can be implemented. The environment is shown containing application servers 110A, 110B and 110C, application databases 130A, 130B and 130C, network 120, data-warehouse 140, reports server 150 and intermediary data storage 160. Each system/device is described below in further detail.

Network 120 provides the connectivity to facilitate forwarding of data from application databases 130A through 130C to data-warehouse 140 and intermediary data storage 160 on the corresponding paths. Network 120 may be implemented using protocols such as Internet Protocol.

Application servers 110A, 110B and 110C execute instructions in each corresponding application and change (add/delete/update) data in corresponding application database 130A, 130B and 130C. Application databases 130A through 130C store data which are accessed by applications executed on each corresponding application server 110A, 110B and 110C respectively. Application databases 130A through 130C may further maintain the status of the data indicating whether the data has been sent to either intermediary database 160 or data-warehouse 140.

Data-warehouse 140 stores large volumes of transaction data generated after processing the data stored in application databases 130A-130C. The data in the data-warehouse may not include 'transient data' (defined above) due to the intervals at which the data the data-warehouse may be refreshed.

Reports server 150 generates reports from the data stored in data-warehouse 140, as well as transient data (using the data in intermediary data storage 160) according to various aspects of the present invention, as described below in further detail.

Flow Chart

Figure 2:
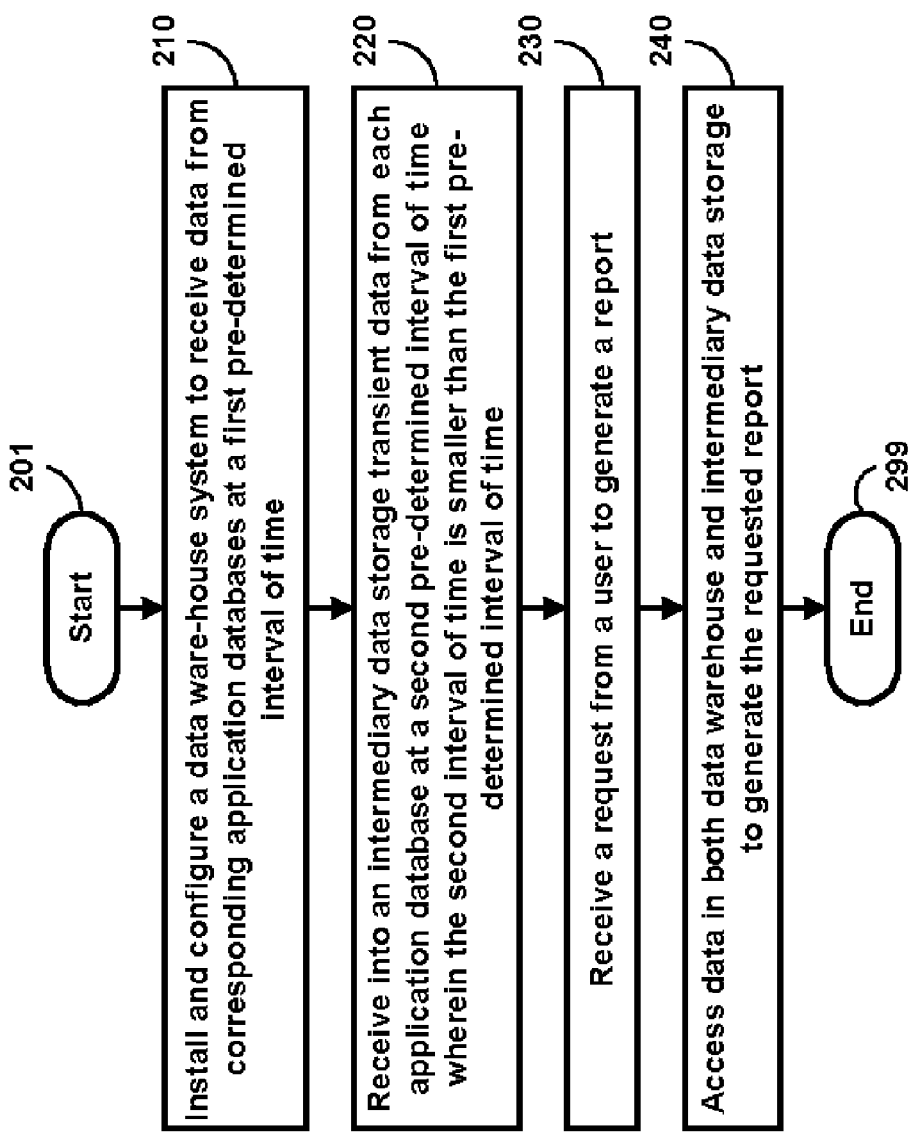
FIG. 2 is a flow chart illustrating the manner in which a reports server generates reports considering transient data and data in a data-warehouse according to various aspects of the present invention.

FIG. 2 is a flowchart illustrating the manner in which a reports server generates reports from the data stored in a data-warehouse, as well as transient data according to various aspects of the present invention. The flowchart is described with respect to FIG. 1 merely for illustration. However, various features can be implemented in other environments without departing from several aspects of the present invention, as will be apparent to one skilled in the relevant arts by reading the disclosure provided herein. The flow chart begins in step 201, in which control immediately passes to step 210.

In step 210, data-ware-house 140 is installed and configured to receive data from application databases 130A, 130B and 130C at a first pre-determined interval of time. As noted above, the first interval of time is generally maintained high to avoid the overhead associated with the ETL process. As a result, the data received may not include the current data stored in the application databases after the previous ETL process. Various aspects of the present invention enable such transient data also to be included, as described below in further detail.

In step 220, transient data are received into intermediary data storage 160 from each of the application databases 130A-130C at a second pre-determined interval of time wherein the second interval of time is smaller than the first pre-determined interval of time. Data changes in each application database after the previous update of the data-warehouse with the data in the application databases are identified as Transient Data".

In step 230, reports server 150 receives a request from a user to generate a report. Requests generally indicate the criteria for selection of data while generating the report. Depending on the selection criteria, data in data-warehouse 140 and intermediary data storage 160 are accessed to generate the requested report as indicated in step 240. Control is then transferred to step 299, in which the flowchart ends.

Transient data in application databases 130A, 130B and 130C can be transferred to intermediary data storage 160 using any of several techniques, well known in the relevant arts. The description is continued with an illustration of one such technique.

Storing Transient Data in Intermediary Data Storage

Figure 3:
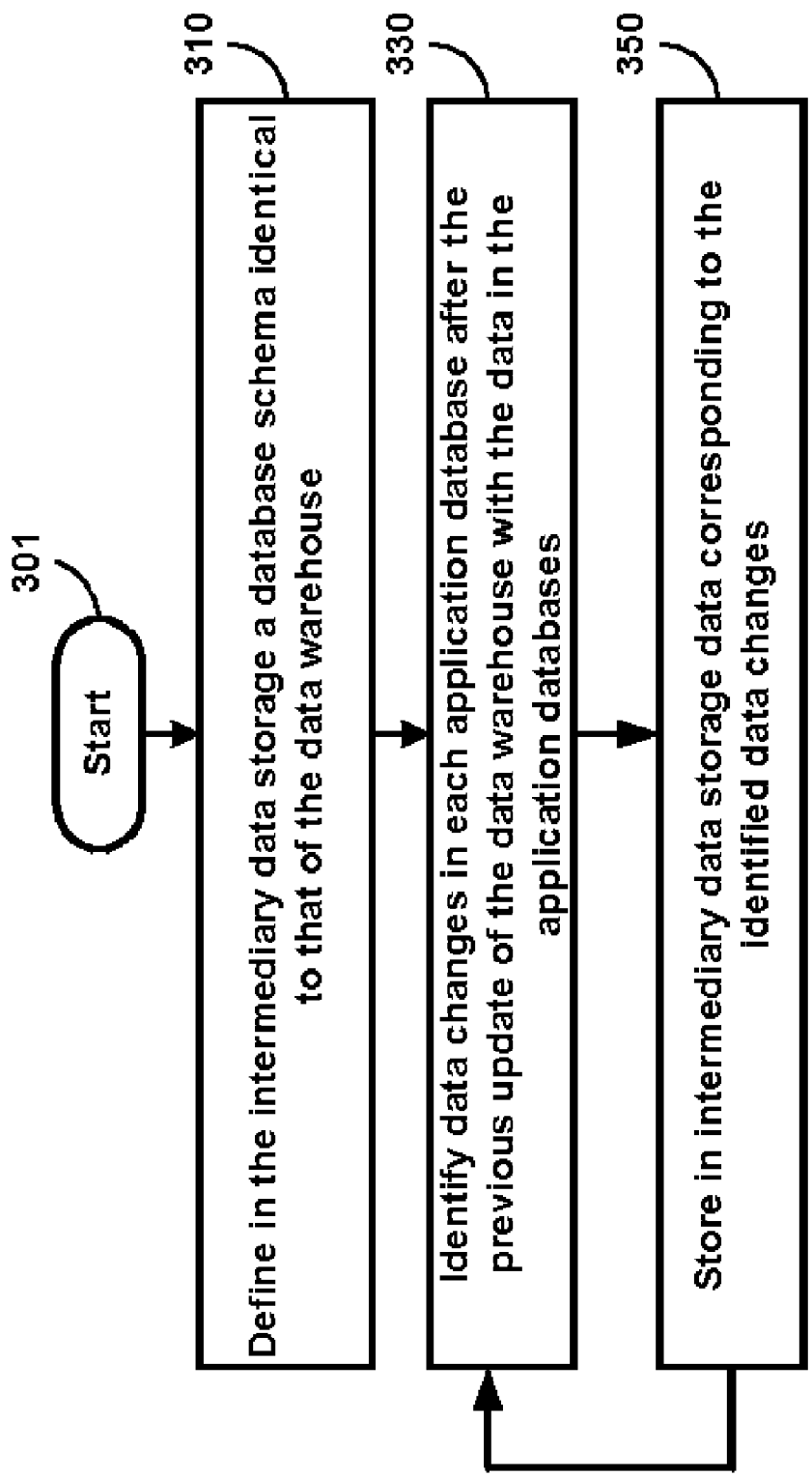
FIG. 3 is flow chart illustrating the manner in which transient data is processed to store in an intermediary data storage according to various aspects of the present invention.

FIG. 3 is flow chart illustrating the manner in which transient data from application databases can be stored in an intermediary data storage. The flowchart is described with respect to FIG. 1 merely for illustration. However, various features can be implemented in other environments without departing from several aspects of the present invention, as will be apparent to one skilled in the relevant arts by reading the disclosure provided herein. The flowchart begins in step 301, in which control immediately passes to step 310.

In step 310, a database schema is defined in intermediary data storage 160 identical to that of data-warehouse 140. By such definition of the schema of intermediary data storage 160, processing of the transient data in intermediary data storage 160 can be performed by executing (substantially) the same ETL process used.

In step 330, data changes ("transient data") in each application database after the previous update of the data-warehouse with the data in the application databases are identified. Identification of such transient data can be performed by using various techniques. In an embodiment, additional status information (e.g., by having an associated date/time change or creation of each record) indicating whether the data in application database 130A-130C has been transferred to data-warehouse 140 is maintained.

In step 350, the identified data of step 330 is processed and stored in intermediary data storage 160. Control passes to step 330 to execute steps 330 and 350 at each time point (or instance) determined by the value of second pre-determined interval of time.

The description is continued with an illustration of an example data set in application database and subsequent storing of transient data into intermediary data storage 160.

Example Transaction and Transient Data

FIG. 4 indicates a table containing an example set of transaction data. As may be observed, the table of FIG. 4 is shown containing transaction identifier 410, transaction number 420, amount 430, discount % 440, final amount 450, transaction date 460 and status 470. For conciseness, only columns which are relevant to an understanding of an embodiment according to the present invention are described in detail below.

The value in column transaction date 460 for row 411 indicates that the transaction has been updated on 10 Oct. 2005. Transaction of row 411 can be identified by the value 1000 as indicated in column transaction identifier 410. Value 'Y' under the column status 470 for row 411 indicates that the transaction data contained in row 411 has been processed and is stored in data-warehouse 140.

Similarly, rows 412 & 413 contain values under columns transaction identifier 410, transaction date 460 and status 470 as (1001, 15 Oct. 2005, 'N') and (1002, 16 Oct. 2005, 'N') respectively. Value 'N' under status 470 (for rows 412 and 413) indicates that the transactions are not processed by the ETL process and hence are not transferred to data-warehouse 140.

For simplicity, it is assumed that the first pre-determined interval of time corresponds to 10 Oct. 2005, when data (indicated by row 411) in application database 130A is processed by the ETL process and stored in data-warehouse 140. According to step 330, rows 412 and 413 are identified as transient data.

The description is continued with an illustration of how data contained in transient data rows can be processed before storing in intermediary data storage 160, in an embodiment of the present invention.

Processing Transient Data

FIG. 5 indicates the manner in which transient data may be represented before forwarding to intermediary data storage 160 in one embodiment. The processed transient data of FIG. 5 is shown represented using Extended Markup Language. Lines 511-527 contain processed data corresponding to rows 412 and 413 indicating transient data. Each line of FIG. 5 is described briefly below.

Lines 512-518 contain processed transient data corresponding to row 412. As may be appreciated, line 513 contains the value "1001" within the tags TRX_ID, which correspond to the value contained in column transaction identifier 410 of row 412. Similarly, line 514 contains value "AMUL- 1001" within the tags "TRX_NUMBER", which correspond to the value contained in column transaction number 420 of row 412.

Line 515 contains a value 1000 within the tags "TRX_A-MOUNT" which correspond to the value in column Amount 430 of row 412. Line 516 contains a value of 10 within the tags "TRX_DISCOUNT", which correspond to the value contained in column 'Discount % 440' of row 412 and line 517 contains a value of 900 within the tags "TRX_FINAL_A-MOUNT", which correspond to the value contained in column "Final Amount 450".

The values enclosed within the corresponding tags "TRX_ID", "TRX_NUMBER", "TRX_AMOUNT", "TRX_DISCOUNT", "TRX_FINAL_AMOUNT" in lines 521, 522, 523, 524 and 525 respectively indicate the processed data using the values contained in corresponding columns "TRANSACTION IDENTIFIER 410", "TRANSACTION NUMBER 420", "AMOUNT 430", "DISCOUNT % 440" and "FINAL AMOUNT 450" of row 413. For simplicity, the data in FIG. 5 is shown to be identical to that in FIG. 4, however, the data can be different depending on the processing (according to ETL) that would be performed prior to logging in the data warehouse.

Line 515 contains a value 1000 within the tags "TRX_A-MOUNT" which corresponds to the value in column Amount 430 of row 412. Line 516 contains a value of 10 within the tags "TRX_DISCOUNT", which corresponds to the value contained in column 'Discount % 440' of row 412 and line 517 contains a value of 900 within the tags "TRX_FINAL_A-MOUNT", which correspond to the value contained in column "Final Amount 450".

The XML data thus generated, can be forwarded to intermediary data storage 160 using protocols such as Simple Object Access Protocol (SOAP), well known in the relevant arts. Each XML entry can be generated (and stored in an XML file) soon after the corresponding transaction is recorded in the application database, and (the file content) transferred to the intermediary data storage at second pre-determined intervals. The XML file can be removed soon after the XML entries are appropriately transferred.

Intermediary data storage 160 receives the corresponding SOAP messages and stores the transient data (in a local database). The data in intermediary data storage 160 is illustrated with respect to FIG. 6, described below.

Transient Data in Intermediary Data Storage

FIG. 6 contains a table stored in intermediary data storage 160 corresponding to the transient data received from application databases 130A-130C. As may be appreciated, intermediary data storage 160 contains a database schema identical to the fact table and dimension table as that of data-warehouse 140. The table is shown containing 3 columns transaction id_staged 610, transaction_# STAGED 620 and TRX_FINAL_AMOUNT_STAGED 630, and stores the data corresponding to rows 412 and 413.

Thus, using the data available from data-warehouse 140 and intermediary data storage 160, reports server 150 may include at least a portion of the transient data (to the extent propagated to intermediary data storage 160) in generating desired reports. However, it should be appreciated that suitable mechanisms need to be implemented to ensure that reports are generated considering possible duplication of data in a combination of application databases 130A-130C, data-warehouse 140 and intermediary data storage 160. In addition, data-warehouse 140 needs to be updated with transient data using a suitable approach, while taking into account the availability of the same source information at multiple sources (i.e., at the application databases and the intermediary database).

In an embodiment, data-warehouse 140 copies data from application databases 130A-130C only (by suitable ETL process executed at the first pre-determined interval, noted above). Status 470 column is updated to reflect the specific records copied to data-warehouse 140, as a result.

Data-warehouse 140 may also indicate to intermediary storage 160, the specific records that are copied from application databases, and intermediary storage 160 may be implemented to remove the corresponding records. The records may be flagged by a combination of the identifier of the application database and transaction identifier 410.

Alternatively, or in addition, more complex protocols may be implemented to copy the transient data from intermediary data storage 160 and application databases 130-130C, and logic may be implemented in data-warehouse 140 to avoid storing of duplicate information.

Since the data in the intermediary storage is updated with transient data more frequently, the reports may be generated considering more transient data as well.

It should be appreciated that each of application server 130A-130C, intermediary storage 160, data-warehouse 140, and reports server 150 may be implemented in a combination of one or more of hardware, software and firmware. The description is continued with respect to an embodiment which various features are operative by execution of corresponding software instructions.

Digital Processing System

Figure 7:
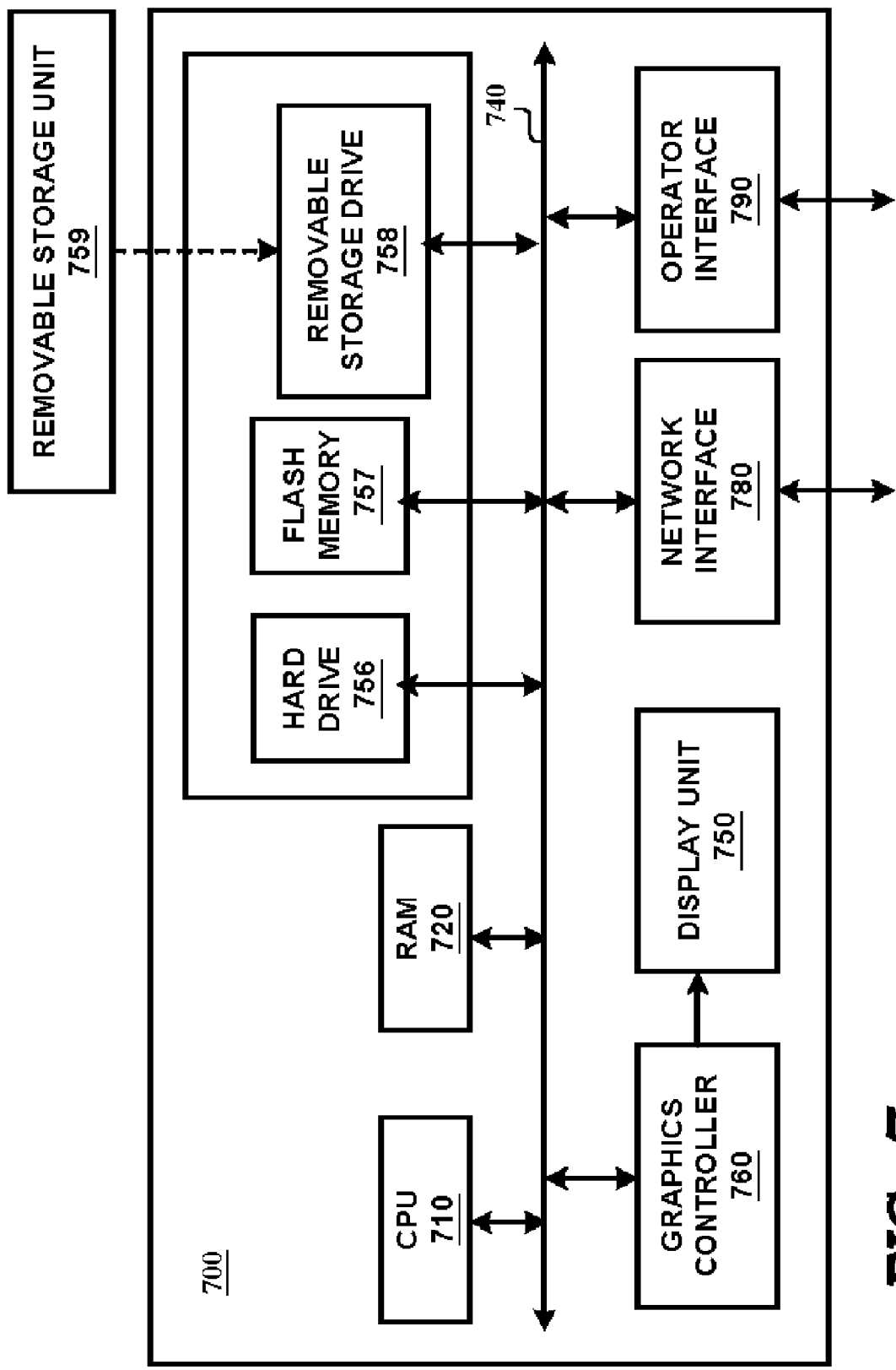
FIG. 7 is a block diagram illustrating the details of the servers in another embodiment.

FIG. 7 is a block diagram illustrating the details of digital processing system 700 in which various aspects of the present invention are operative by execution of appropriate software instructions. System 700 may correspond to application servers 130A-130C, intermediary storage 160, data-warehouse 140 or reports server 150. System 700 may contain one or more processors such as central processing unit (CPU) 710, random access memory (RAM) 720, secondary memory 730, graphics controller 760, display unit 770, network interface 780, and operator interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present invention. CPU 710 may contain multiple processing units, with each processing unit potentially being designed for a specific task. Alternatively, CPU 710 may contain only a single general purpose processing unit. RAM 720 may receive instructions from secondary memory 730 using communication path 750.

Graphics controller 760 generates display signals (e.g., in RGB format) to display unit 770 based on data/instructions received from CPU 710. Display unit 770 contains a display screen to display the images defined by the display signals. Operator interface 790 may correspond to a key-board and/or mouse. Network interface 780 provides connectivity to a network (e.g., using Internet Protocol), and may be used to communicate with each other system of FIG. 1.

Secondary memory 730 may contain hard drive 735, flash memory 736 and removable storage drive 737. Secondary memory 730 may store the data and software instructions (e.g., methods instantiated by each of client system), which enable system 700 to provide several features in accordance with the present invention. Some or all of the data and instructions may be provided on removable storage unit 740, and the data and instructions may be read and provided by removable storage drive 737 to CPU 710. Floppy drive, magnetic tape drive, CD-ROM drive, DVD Drive, Flash memory, removable memory chip (PCMCIA Card, EPROM) are examples of such removable storage drive 737.

Removable storage unit 740 may be implemented using medium and storage format compatible with removable storage drive 737 such that removable storage drive 737 can read the data and instructions. Thus, removable storage unit 740 includes a computer readable storage medium having stored therein computer software and/or data.

In this document, the term "computer program product" is used to generally refer to removable storage unit 740 or hard disk installed in hard drive 735. These computer program products are means for providing software to system 700. CPU 710 may retrieve the software instructions, and execute the instructions to provide various features of the present invention described above.

Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A system comprising:
    a plurality of application databases, with each of said plurality of application databases recording a plurality of transactions;
    a data-warehouse receiving and storing said plurality of transactions, wherein transactions are received and stored in said data-warehouse at a first set of pre-determined time instances such that a first set of transactions of said plurality of transactions are stored in said data-warehouse before a first time instance, said data-warehouse containing a plurality of columns and a plurality of rows, each row corresponding to one of said plurality of transactions and having a corresponding value for each of said plurality of columns;
    an intermediary storage receiving transient data from said plurality of application databases, wherein said transient data comprises data corresponding to a set of transient transactions not yet stored in said data-warehouse after each of said first set of pre-determined time instances such that a second set of transactions of said set of transient transactions are in said intermediate storage, but not yet stored in said data-warehouse at a second time instance, wherein said transient data contains values for at least some of said plurality of columns corresponding to said set of transient transactions, wherein said second time instance is after said first time instance; and
    a reports server generating a single report based on the values contained in both of said plurality of transactions stored in said data-warehouse and said set of transient transactions stored in said intermediary storage at said second time instance,
    wherein the values of said transient transactions used in generating said single report are all later stored in said data-warehouse at a third time instance after said single report is generated, wherein said third time instance is after said second time instance.

2. The system of claim 1, wherein said data-warehouse receives and stores said plurality of transactions at a first pre-specified interval and said intermediary storage receives said transient data at a second pre-specified interval, wherein said first pre-specified interval is more than said second pre-specified interval such that said set of transient transactions is available and used for generating said report during said second pre-specified interval.

3. The system of claim 2, wherein said intermediary storage stores said transient data according to a database schema identical to that in said data-warehouse.

4. The system of claim 3, wherein said transient data is received in XML format.

5. The system of claim 1, wherein said data-warehouse receives and stores a first set of transactions before said first time instance and a second set of transactions at said third time instance,
    wherein said first set of transactions and said second set of transactions are contained in said plurality of transactions,
    wherein said set of transient transactions comprises at least some of said second set of transactions between said first time instance and said third time instance,
    wherein said reports server generates said report at said second time instance based on said first set of transactions and said at least some, but not all, of said second set of transactions.

6. The system of claim 1, wherein a first application database maintains a status information indicating that a third set of transactions have been already stored in said data-warehouse at a fourth time instance and that a fourth set of transactions have not yet been stored in said data-warehouse at said fourth time instance, said first application database being contained in said plurality of application databases,
    wherein said set of transient transactions received by said intermediary storage at said fourth instance includes said fourth set of transactions based on said status information,
    wherein said report server generates said report after said fourth instance based on said third set of transactions stored in said data-warehouse and said fourth set of transactions included in said transient data.

7. A method of generating a single report based on a desired criteria, said method being performed in a reporting server, said method comprises:
    receive a first set of records matching said desired criteria from a data-warehouse such that said first set of records are available at said data-warehouse at a first time instance, wherein said first set of records are stored in said data-warehouse based on records generated by a plurality of application databases;
    receive a second set of records matching said desired criteria from an intermediary data storage at a second time instance, wherein said second set of records comprise transient data generated since said first set of records are available in said data-warehouse at said first time instance, wherein said transient data is not yet stored in said data-warehouse at said second time instance; and
    processing said first set of records and said second set of records at said second time instance to generate said report, whereby said single report is generated based on data in said data-warehouse as well as on transient data,
    wherein said second set of records are stored in said data-warehouse at a third time instance which follows said second time instance.

8. The method of claim 7, wherein said first set of records does not include any of said second set of records.

9. A method of supporting transactions, said method comprising:
    generating each of a plurality of sets of transactions in respective one of a plurality of application databases;

storing said plurality of sets of transactions in a data-warehouse before a first time instance, wherein each of said plurality of sets of transactions are received and stored in said data-warehouse at a corresponding one of a plurality of time instances;

receiving and storing in a transient database a corresponding one of a plurality of transient data from respective one of application databases before a second time instance which follows said first time instance, wherein each transient data comprises data generated by the corresponding application database after the corresponding one of said plurality of time instances such that the transient data is not yet stored in said data-warehouse as of said second time instance; and generating a single report based on said plurality of transactions stored in said data-warehouse and said plurality of transient data stored in said transient database at a third time instance which follows said second time instance, wherein said transient data is stored in said data-warehouse at a third time instance which follows said second time instance.

10. The method of claim 9, wherein said report is generated based on a desired criteria, said method further comprising:

receiving a first set of records matching said desired criteria from said data-warehouse, wherein said first set of records are stored in said data-warehouse based on records generated by said plurality of application databases; and receiving a second set of records matching said desired criteria from said transient database, wherein said second set of records comprise said plurality of transient data generated after said first set of records are available in said data-warehouse, wherein said generating comprises processing said first set of records and said second set of records to generate said report, whereby said report is generated based on data in said data-warehouse as well as said transient database.

11. The method of claim 10, wherein said data-warehouse receives and stores said plurality of sets of transactions at a first pre-specified interval and said transient database receives and stores said plurality of transient data at a second pre-specified interval, wherein said first pre-specified interval is more than said second pre-specified interval.

12. The method of claim 11, wherein said transient database stores said plurality of transient data according to a database schema identical to that in said data-warehouse.

13. The method of claim 12, wherein said plurality of transient data is received in XML format.

14. The method of claim 9, wherein said data-warehouse receives and stores a first set of transactions at said first time instance and a second set of transactions at said third time instance, wherein said first set of transactions and said second set of transactions are contained in said plurality of sets of transactions, wherein said transient database receives and stores said plurality of transient data comprising at least some of said second set of transactions before said second time instance which is between said first time instance and said third time instance, wherein said report is generated at second time instance based on said first set of transactions and said at least some of said second set of transactions.

15. The method of claim 9, further comprising:

maintaining a status information in one of said plurality of application databases, said status information indicating that a third set of transactions have been already stored in said data-warehouse at a fourth time instance and that a fourth set of transactions have not yet been stored in said data-warehouse at said fourth time instance, wherein said plurality of transient data received and stored by said transient database at said fourth instance includes said fourth set of transactions based on said status information, wherein said report is generated after said fourth instance based on said third set of transactions stored in said data-warehouse and said fourth set of transactions included in said plurality of transient data.

* * * * *

UNITED STATES PATENT AND TRADEMARK OFFICE
CERTIFICATE OF CORRECTION

PATENT NO. : 7,908,243 B2  Page 1 of 1
APPLICATION NO. : 11/306807
DATED : March 15, 2011
INVENTOR(S) : Mishra It is certified that error appears in the above-identified patent and that said Letters Patent is hereby corrected as shown below:

In column 3, line 42, delete "Transient Data"." and insert -- "Transient Data". --, therefor.

Signed and Sealed this
Fourth Day of October, 2011

David J. Kappos
*Director of the United States Patent and Trademark Office*